United States Patent [19]

Bushong

[11] Patent Number: 4,625,265
[45] Date of Patent: Nov. 25, 1986

[54] SIGNAL SUPPORTING APPARATUS

[76] Inventor: Richard R. Bushong, 1406 Prueter St., Saginaw, Mich. 48601

[21] Appl. No.: 736,292

[22] Filed: May 20, 1985

Related U.S. Application Data

[63] Continuation-in-part of Ser. No. 651,060, Sep. 17, 1984, abandoned.

[51] Int. Cl.⁴ ............................................. B60Q 1/00
[52] U.S. Cl. ...................................... 362/80; 362/61; 340/87; 116/28 R
[58] Field of Search ...................... 362/61, 80; 340/68, 340/87, 50, 84, 90; 116/28 R, 202

[56] References Cited

U.S. PATENT DOCUMENTS

| | | | |
|---|---|---|---|
| 1,672,779 | 6/1928 | Raidt | 362/80 |
| 1,674,340 | 6/1928 | Nock | 362/80 |
| 2,905,925 | 9/1959 | Whiteneck | 362/80 |
| 3,305,961 | 2/1967 | Lanzon et al. | 362/80 |
| 3,460,728 | 8/1969 | Adamson | 362/80 |
| 3,781,790 | 12/1973 | Dawson | 340/97 |
| 3,783,267 | 1/1974 | Thomas | 340/87 |
| 3,905,017 | 9/1975 | Samra | 340/95 |
| 4,020,047 | 4/1977 | Burland | 340/87 |
| 4,473,868 | 9/1984 | Moore | 362/80 |

Primary Examiner—E. Rollins Cross
Attorney, Agent, or Firm—Learman & McCulloch

[57] ABSTRACT

A support for removably mounting a signal on the roof of a vehicle comprises a body connected at one end to the signal and having legs at its opposite end for removable accommodation between a pair of hinged members. One of the hinged members is fixed to the vehicle and the other is spring biased toward the fixed member. The legs of the body have retainers removably accommodated in openings formed in the movable one of the hinged members.

16 Claims, 7 Drawing Figures

SIGNAL SUPPORTING APPARATUS

RELATED APPLICATION

This application is a continuation-in-part of application Ser. No. 651,060 filed Sept. 17, 1984 now abandoned.

BACKGROUND OF THE INVENTION

There are many instances in which an automotive vehicle should be equipped with a signaling device so as to promote visibility of the vehicle and call attention to an unusual or emergency situation. Some vehicles, such as police cars and fire trucks, are fitted permanently with housings within which are mounted rotating or flashing lights. There are other vehicles, however, which are not equipped with permanent signal installations, but which make use of housings containing rotating or flashing lights and which are detachably secured to the vehicles by suction cups, magnets, and the like. Such detachable mounting devices are relatively insecure in that they are susceptable to detachment due to the forces of acceleration and deceleration, as well as wind forces.

The use of magnets, suction cups, and similar means for detachably supporting a signal housing on a vehicle also is objectionable for the reason that such devices may mar, scratch, or otherwise damage the finish of the vehicle.

A principal object of the invention, therefore, is to provide apparatus for detachably mounting a signaling device on a vehicle and which overcomes the disadvantages referred to above.

SUMMARY OF THE INVENTION

A signal support constructed in accordance with the invention comprises a bracket having a body at one end of which is secured a housing having transparent or translucent side walls and within which is a signaling device of known kind. At its other end the bracket terminates in reversely turned legs that are adapted to be accommodated between a pair of hinged members, one of which is affixed to a vehicle's door frame and the other of which is movable to facilitate accommodation of the legs between the movable members. The legs are equipped with headed studs that removably may be accommodated in bayonet slots formed in the movable member of the anchor device, and such movable member is biased by spring means toward the fixed member so as securely, but removably, to retain the signal and its support on the vehicle by means of the anchor device.

In another embodiment the anchor device is provided with slots for the accommodation of retaining tangs formed on the legs of the bracket.

THE DRAWINGS

Preferred embodiments of the invention are described in the following specification and illustrated in the drawings, wherein.

DETAILED DESCRIPTION

Figure 1:
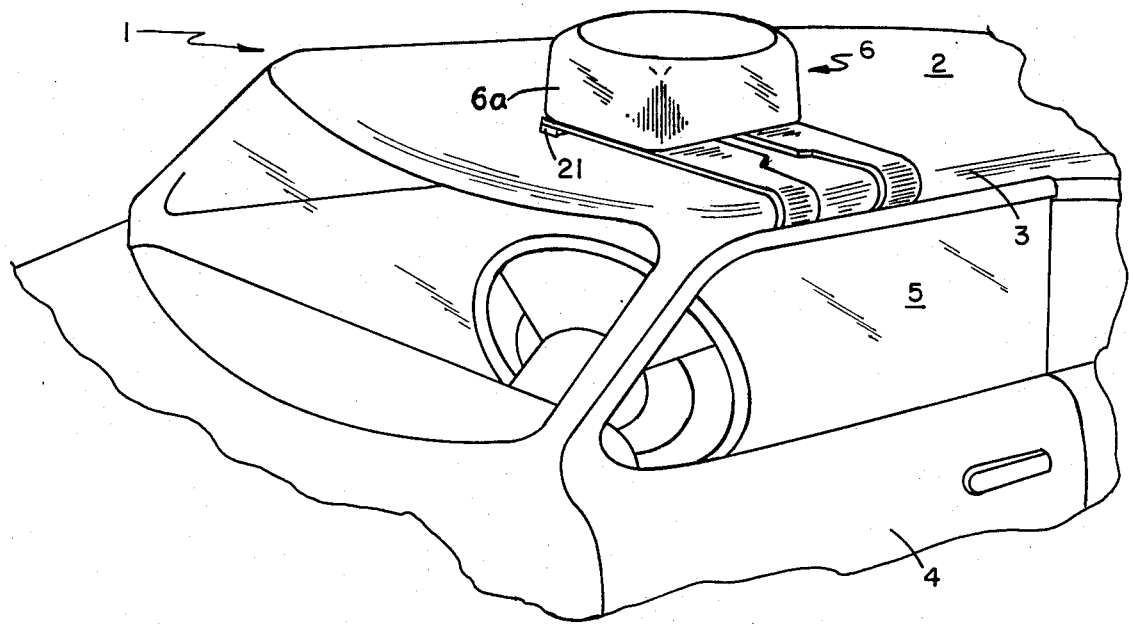
FIG. 1 is a fragmentary, isometric view of a vehicle equipped with a signal supported by apparatus constructed in accordance with the invention.
Figure 2:
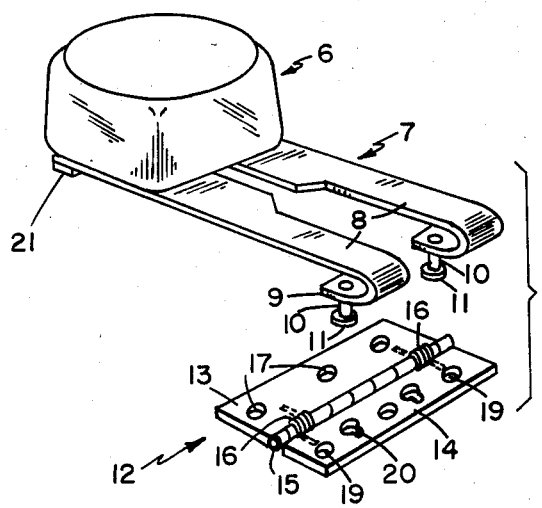
FIG. 2 is an exploded, isometric view of the support apparatus.
Figure 3:
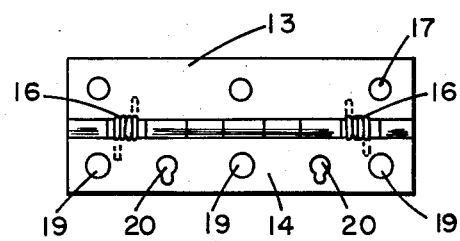
FIG. 3 is a plan view of the anchor device.

Apparatus constructed in accordance with the invention is adapted for use in conjunction with a vehicle 1 having a roof 2 terminating at one side in a generally vertical edge 3 which defines, in part, a doorway adapted to be closed by a door 4 and a window 5.

The apparatus also is adapted for use with a signal housing 6 having transparent or translucent sides 6a and within which is a flashing or rotating lamp (not shown). The signal lamp may be operated by a battery (not shown), or by energy supplied by the vehicle's alternator via a plug that may be fitted into the vehicle's cigarette lighter and connected to the lamp by suitable wiring.

In the disclosed embodiments, the signal housing 6 is screwed, bolted, or otherwise suitably fixed to one end of a support bracket 7 having arms 8 terminating at their free ends in reversely turned legs 9 that parallel, but are spaced from the arms 8. In the embodiment of FIGS. 1-4, each of the legs 9 is fitted with a stud 10 having a head 11 spaced from the legs 9.

The support apparatus also includes an anchor device 12 comprising a pair of planar leaves or members 13 and 14 joined together by a hinge 15. The members 13 and 14 are biased by means of springs 16 to positions in which they confront one another.

The member 13 has a number of openings 17 therein for the accommodation of screws 18 (FIG. 4) so as to secure the member 13 to the lower surface of the roof 2 adjacent the door opening. In this position of the anchor device 12 the member 14 confronts and underlies the member 13.

The member 14 has openings 19 corresponding in number to the number of openings 17 and similarly spaced from one another. The diameter of the openings 19, however, is greater than that of the openings 17 so as to enable a screw driver to be inserted through the openings 19 and manipulate the screws 18.

In the embodiment of FIGS. 1-4, the member 14 includes a pair of bayonet slots 20 for the accommodation of the studs 10.

Figure 6:
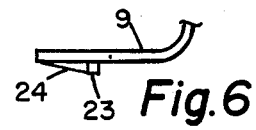
FIG. 6 is a side elevational view of the modification.
Figure 7:
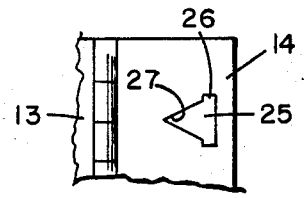
FIG. 7 is a plan view of a modified anchor device.
Figure 5:
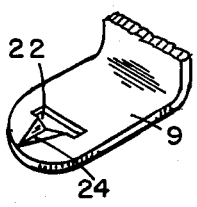
FIG. 5 is a fragmentary, isometric view of a modified form of the invention.

In the embodiment of FIGS. 5-7, each leg 9 is provided with an opening 22 adjacent which is a depending tang or tongue 23. The leg 9 also is depressed to form a V-shaped, reinforcing member 24 against which the tang 23 abuts. The member 14 is provided with an opening 25 having a section 26 which snugly receives the tang 23 and a triangular section 27 which accommodates the groove formed by the reinforcement guides the tang to seated position in the section 26 and helps to hold the legs 9 firmly, but removably, in the openings of the anchor member.

To condition the apparatus for operation, the member 13 of the anchor device 12 is secured by the screws 18 to the lower side of the vehicle roof 2 adjacent the doorway. The members 13 and 14 will occcupy the confronting positions shown in FIG. 4, and in such positions there is ample clearance between the under surface of the roof and the door 4 to accommodate the anchor device 12.

Figure 4:
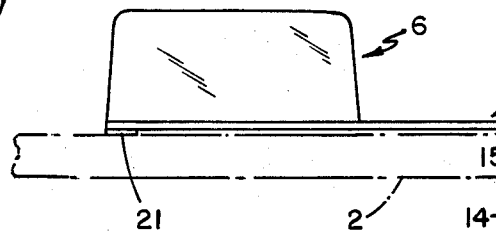
FIG. 4 is an elevational view showing the apparatus mounted in position on a vehicle, the vehicle being shown in phantom lines.

When it is desired to mount the signal housing 6 on the vehicle, the door 4 is opened and the member 14 swung counterclockwise from the position shown in FIG. 4 so as to enable the studs 10 or the tangs 23 to be fitted into the bayonet slots 20 or the opening 26. The member 14 then may be released whereupon the springs 16 will cause the member 14 to move toward the member 13, thereby gripping the legs 9 between the members 13 and 14. The door 4 then may be closed. There is insufficient clearance between the anchor 12 and the door when the latter is closed to permit separation of the members 13 and 14 a distance sufficient to enable the legs 9 to be withdrawn from between the members 13 and 14.

As is best shown in FIG. 4, the spacing between the arms 8 and the legs 9, including the studs 10 and the tangs 23, is such as to enable the edge 3 of the roof 2 to be accommodated in such space, thereby enabling the housing 6 to be located securely atop the roof 2. Preferably, that surface of the support 7 which confronts the roof 2 is provided with a suitable pad 21 which will prevent scratching or marring of the roof.

When it is desired to remove the signal from the roof of the vehicle, the door may be opened, the movable member 14 swung downwardly, and the legs removed from between the members of the anchor device. Upon release of the member 14 it will be returned by the springs to confronting relation with the fixed member 13, thereby enabling the door to be closed.

The disclosed embodiments are representative of presently preferred forms of the invention, but are intended to be illustrative rather than definitive thereof. The invention is defined in the claims.

I claim:

1. Apparatus for mounting a signal device on an automotive vehicle comprising a support; means for securing a signal to said support; anchor means having a pair of relatively movable confronting members between which said support is accommodated; means for mounting one of said members on a vehicle; and cooperable retaining means carried by said support and said anchor means for removably retaining said support between the members of said anchor means.

2. Apparatus according to claim 1 including means yieldably biasing said members toward one another.

3. Apparatus according to claim 1 wherein said members comprise hinged leaves movable toward and away from one another.

4. Apparatus according to claim 3 including spring means biasing said leaves toward one another.

5. Apparatus according to claim 1 wherein said retaining means comprises studs on said support and stud-accommodating openings in one of said members.

6. Apparatus according to claim 5 wherein said openings comprise bayonet slots.

7. Apparatus according to claim 1 wherein said retaining means comprises tangs on said support and tang-accommodating openings in one of said members.

8. Apparatus according to claim 7 wherein said tangs abut reinforcements carried by said support.

9. Apparatus according to claim 1 wherein said support comprises a bracket at one end of which said signal is adapted to be secured, said support having another end reversely turned for accommodation between said members of said anchor device.

10. Apparatus for mounting a signal device on an automotive vehicle comprising; a support having a body to one end of which a signal is secured, said support having legs at its opposite end underlying said body in spaced, substantially parallel relation thereto; anchor means having a pair of relatively movable members confronting one another and between which the legs of said body are removably accommodated; means for mounting one of said members on a vehicle; and cooperable retaining means carried by said legs and the other of said members for removably retaining said legs between said members.

11. Apparatus according to claim 10 including spring means acting on said members and biasing them toward one another.

12. Apparatus according to claim 10 wherein said members of said anchor means comprise leaves hinged together for movements toward and away from one another.

13. Apparatus according to claim 10 wherein said cooperable retaining means comprise studs on said legs and openings in the other member of said anchor means for the removable accommodation of said studs.

14. Apparatus according to claim 11 wherein said openings are bayonet slots.

15. Apparatus according to claim 10 wherein said retaining means comprises tangs on said support and tang-accommodating openings in one of said members.

16. Apparatus according to claim 15 wherein said tangs abut reinforcements carried by said support.

* * * * *